(12) United States Patent
Schmitz et al.

(10) Patent No.: US 11,997,765 B2
(45) Date of Patent: May 28, 2024

(54) FOOD PREPARATION DEVICE WITH PARALLEL ELECTRICAL COLD CONDUCTORS

(71) Applicant: Vorwerk & Co. Interholding GmbH, Wuppertal (DE)

(72) Inventors: Kevin Schmitz, Haan (DE); Sebastian Tietz, Leverkusen (DE)

(73) Assignee: Vorwerk & Co. Interholding GmbH (DE)

( * ) Notice: Subject to any disclaimer, the term of this patent is extended or adjusted under 35 U.S.C. 154(b) by 294 days.

(21) Appl. No.: 17/369,402

(22) Filed: Jul. 7, 2021

(65) Prior Publication Data

US 2022/0015197 A1 Jan. 13, 2022

(30) Foreign Application Priority Data

Jul. 7, 2020 (EP) .................................... 20184513

(51) Int. Cl.
| | | |
|---|---|---|
| *H05B 3/68* | (2006.01) | |
| *A47J 27/00* | (2006.01) | |
| *H05B 3/14* | (2006.01) | |
| *H05B 3/26* | (2006.01) | |

(52) U.S. Cl.
CPC .............. *H05B 3/68* (2013.01); *A47J 27/004* (2013.01); *H05B 3/141* (2013.01); *H05B 3/26* (2013.01); *H05B 3/262* (2013.01); *H05B 2203/002* (2013.01); *H05B 2203/007* (2013.01); *H05B 2203/019* (2013.01); *H05B 2213/07* (2013.01)

(58) Field of Classification Search
CPC ......... A47J 27/004; A47J 43/07; H05B 3/748; H05B 3/141; H05B 3/262; H05B 3/26; H05B 3/68
See application file for complete search history.

(56) References Cited

U.S. PATENT DOCUMENTS

| | | | | |
|---|---|---|---|---|
| 5,043,559 A | * | 8/1991 | Scott ...................... | H05B 3/748 |
| | | | | 219/448.11 |
| 2009/0272728 A1 | * | 11/2009 | Abbott ..................... | H05B 3/68 |
| | | | | 219/399 |
| 2013/0068755 A1 | * | 3/2013 | Frutschy ........... | H01M 10/6571 |
| | | | | 219/542 |
| 2018/0125282 A1 | * | 5/2018 | Metz ...................... | F24C 7/085 |

FOREIGN PATENT DOCUMENTS

| | | | |
|---|---|---|---|
| CN | 2083010 U | * | 4/1990 |
| CN | 108652438 A | * | 10/2018 |
| DE | 102008038783 A1 | | 8/2008 |

(Continued)

OTHER PUBLICATIONS

Wikipedia, Sheet Resistance, Aug. 26, 2009, 3 pages.

*Primary Examiner* — Thien S Tran
(74) *Attorney, Agent, or Firm* — Barnes & Thornburg LLP

(57) ABSTRACT

The application relates to food preparation apparatus with an electrical heating device comprising at least two electrical PTC thermistors for heating a food in a food preparation space, wherein the electrical PTC thermistors are electrically connected in parallel. The parallel-connected PTC thermistors are electrically connected to each other by one or more electrical bridges.

Figure 1:
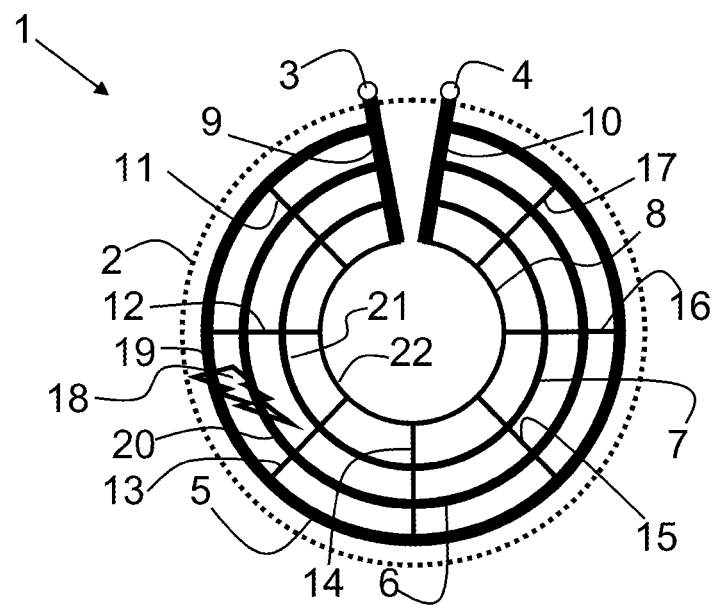

Using designs in accordance with the present application, local heating during the preparation of a food may be avoided.

19 Claims, 5 Drawing Sheets

(56) References Cited

FOREIGN PATENT DOCUMENTS

| | | | | |
|---|---|---|---|---|
| EP | 0715483 | A2 | 6/1996 | |
| JP | 2007143804 | A * | 6/2007 | .......... A47J 37/0709 |
| WO | 9102481 | A1 | 3/1991 | |
| WO | 9819499 | A1 | 10/1996 | |
| WO | WO-9819499 | A1 * | 5/1998 | ............... H05B 3/26 |

* cited by examiner

FOOD PREPARATION DEVICE WITH PARALLEL ELECTRICAL COLD CONDUCTORS

CROSS REFERENCE TO RELATED APPLICATIONS

This application claims priority to and the benefit of European Patent Application Number 20184513.8, filed 7 Jul. 2020, the disclosure of which is now expressly incorporated herein by reference.

FIELD OF THE DISCLOSURE

The invention relates to a food preparation apparatus with an electrical heating device comprising at least two electrical PTC thermistors for heating a food in a food preparation space, wherein the electrical PTC thermistors are electrically connected in parallel.

BACKGROUND

Foods are regularly heated for their preparation. This is done, for example, by means of a stove equipped with at least one heating plate in the form of a hot plate. A hot plate is a plate that can be heated by a heating device.

A hotplate may be circular. However, it may also be a plate that can only be heated in regions. It may be one or more circular regions that can be heated. By heating the plate or a region of the plate, heat is transferred from the plate to a cooking vessel placed thereon. A food located in the cooking vessel may thus be heated.

From the publication DE 10 019 126 A1 a food processor with a mixing vessel and a drive for a mixer in the mixing vessel is known. At the bottom of the mixing vessel there is an electrical resistance heating element with conductive tracks applied to a dielectric. By heating the bottom of the mixing vessel, a food may be heated in the mixing vessel. The mixing vessel thus also serves as a cooking vessel.

It is desired to heat a bottom of a cooking vessel uniformly to avoid local overheating of a food during its preparation. To achieve this, the bottom of a cooking vessel may comprise materials with good thermal conductivity, such as copper or aluminum, which serve as heat spreading layers. Heat supplied to the bottom is to be evenly distributed by the materials with good thermal conductivity. An example of such a cooking vessel is known from the publication DE 20 2004 007 542 U1.

If a bottom of a cooking vessel is locally overheated, the heating device may be switched off until thermal equilibrium is reached. A cooking process is then delayed accordingly.

A cooking vessel provides a space for preparing a food. Such a space is therefore referred to as food preparation space in the following.

Oven as well as microwave oven are further examples of food preparation apparatuses. An oven or a microwave oven each comprise a space in which foods are to be heated. Such a space is a food preparation space. It is also desired in such food preparation spaces to apply heat uniformly to the foods located therein.

Food preparation apparatuses with heating devices are known from the publications DE 10 2008 038 783 A1 and WO 98/19499 A1. A heating device for a food service cart is known from the publication WO 91/02481 A1.

The present disclosure pursues the aim of being able to prepare a food quickly and reliably in a food preparation space with little technical effort.

SUMMARY

A food preparation apparatus equipped with an electrical heating device adapted to quickly and reliably prepare a food in a preparation space with little technical effort is provided in this disclosure. The heating device comprises at least two electrical conductors for heating a food in a food preparation space. The electrical conductors are electrically connected in parallel. The electrical conductors are electrical PTC thermistors.

For heating a food, a current flows through the electrical PTC thermistors provided for this purpose. These are heated accordingly by the electrical current. The heating device may comprise other electrical conductors which are at least hardly heated compared to the electrical PTC thermistors mentioned. These other electrical conductors are not electrical conductors intended and suitable for heating a food.

A PTC thermistor as used in the present disclosure has a positive temperature coefficient. This means that the electrical resistance of the PTC thermistor increases with increasing temperature.

If the PTC thermistors have different electrical resistances, different partial electrical currents are generated when a voltage is applied. The partial electrical currents behave inversely to the respective resistances. In a PTC thermistor with a high-impedance resistance, a relatively small electrical current can flow. In a PTC thermistor with a low-impedance resistance, a relatively high electrical current can flow.

Local overheating causes the electrical resistance of the PTC thermistor affected by the local overheating to increase. If the electrical PTC thermistor which is connected in parallel thereto is not affected by the local overheating, the current in the electrical PTC thermistor affected by the local overheating decreases. The current in the other PTC thermistor increases. Thus, local overheating may be counteracted.

In one embodiment, two electrical PTC thermistors provided for heating a food are electrically connected to each other by one or more electrical bridges. A bridge is thus an electrical conductor. By means of bridges, a subdivision into segments is achieved. If one of the segments is locally overheated, the current flow is reduced only in the region of the segment and not along the entire length of a PTC thermistor affected by the local overheating, through which a food may be heated to a desired temperature.

In one embodiment of the disclosed design, each electrical bridge electrically connects not more than two electrical PTC thermistors. An area to be heated can be suitably divided into a particularly large number of small segments by means of this embodiment. A reduced current flow due to local overheating can be limited to a correspondingly small segment. Uneven temperature distributions are thus avoided in a further improved manner.

In some embodiments, an electrical PTC thermistor provided for heating is electrically connected to a plurality of bridges. This provides a plurality of alternatives for electrical current if a segment of the area that can be heated by PTC thermistors locally overheats. This achieves in a further improved manner that local heating is counteracted in an automated manner.

In some embodiments, the plurality of bridges connected to an electrical PTC thermistor provided for heating a food have equal distances between them. This achieves uniform heating in a further improved manner. The equal distances may only be deviated from if space is required for other reasons, for example for accommodating a temperature sensor or for accommodating electrical contacts for a power supply.

The electrical PTC thermistors provided for heating a food can run along circular paths. Cooking vessels regularly have a circular bottom. It is therefore advantageous that the electrical PTC thermistors provided for heating a food also run along circular paths in order to be able to heat a corresponding vessel suitably uniformly.

The cross-section of the electrical PTC thermistors provided for heating a food can increase with decreasing radius of a circular path. Thus, the width of a track consisting of a PTC thermistor material may increase the smaller the radius of the circular track is. This embodiment further achieves in an improved manner a uniform heat supply for heating a food.

In one embodiment, the electrical PTC thermistors provided for heating are externally circulated by an electrical conductor. Via this circulating conductor, electrical current shall flow suitably uniformly to one or more electrical PTC thermistors which are provided for heating. This circulating electrical conductor may be a ring-shaped closed conductor. However, it is also sufficient that the electrical PTC thermistors provided for heating are only predominantly enclosed by the externally circulating electrical conductor. Thus, for example, the externally circulating electrical conductor may only form a three-quarter circle. An open region may remain, so that the externally circulating electrical conductor is not closed in a ring shape.

The externally circulating electrical conductor consists of a material having an electrical resistivity which is at least 10 times, preferably at least 100 times, lower than the electrical resistivity of the material of which the electrical PTC thermistors provided for heating consist. This measure also serves to ensure a uniform power supply for the electrical PTC thermistors provided for heating.

Bridges are provided which electrically connect the externally circulating electrical conductor to electrical PTC thermistors provided for heating. The externally circulating electrical conductor with the bridges provides a suitably uniform current supply to the electrical PTC thermistors provided for heating the food. The plurality of bridges in turn contributes to the fact that a subdivision into segments may suitably be performed also in the peripheral region of an area to be heated.

In some embodiments, the bridges leading from the externally circulating electrical conductor to one or more electrical PTC thermistors provided for heating a food have equal distances between them. This achieves in a further improved manner a uniform power supply for electrical PTC thermistors provided for heating.

Since the externally circulating electrical conductor is for power supply, it is configured such that it may be connected to an electrical voltage source.

In some embodiments, one or more electrical PTC thermistors provided for heating are internally circulated by an electrical conductor. The internally circulating electrical conductor serves a power supply for the electrical PTC thermistors which are provided for heating. The internally circulating electrical conductor may be a closed conductor. Thus, the internally circulating electrical conductor may have a ring shape. However, the internally circulating electrical conductor need not be 100% internally circulating. Thus, it does not have to be a closed ring shape. For example, a three-quarter circle is sufficient. However, the internally circulating electrical conductor should be predominantly circumferential, i.e. it should extend beyond a semicircle, in order to be able to supply current evenly. The internally circulating electrical conductor consists of a material having an electrical resistivity which is at least 10 times, preferably at least 100 times, lower than the electrical resistivity of the material of which the electrical PTC thermistors provided for heating consist. This measure serves to be able to supply the electrical PTC thermistors provided for heating uniformly with electrical current. Bridges are provided which electrically connect the internally circulating electrical conductor to one or more electrical PTC thermistors provided for heating. This measure also helps to be able to supply electrical current uniformly to electrical PTC thermistors which are provided for heating.

Electrical bridges can consist of a material having an electrical resistivity that is at least 10 times, preferably at least 100 times, lower than the electrical resistivity of which the PTC thermistors provided for heating a food consist. Undesirable local overheating by a bridge is thus avoided. Therefore, all electrical bridges connecting two electrical PTC thermistors provided for heating a food are illustratively configured like that. In illustrated embodiments, all electrical bridges are configured like that which connect an electrical conductor circulating for a power supply to at least one electrical PTC thermistor provided for heating. This also serves to avoid local overheating by a bridge.

Bridges and/or electrical conductors not intended for heating may consist of silver. On the one hand, silver is a very good electrical conductor. On the other hand, silver is corrosion-resistant and thus well suited for use under the conditions that can occur in a food preparation apparatus. Therefore, all bridges and/or the said electrical conductors not intended for heating can consist of silver.

The food preparation vessel comprises at least forty, preferably at least fifty, PTC thermistors electrically connected in parallel, which are provided for heating a food. A large number of such PTC thermistors allows subdivision into very small segments.

Local overheating may therefore be counteracted in an automated manner and very targeted manner.

In one embodiment, a temperature-dependent switch, in particular a bimetal switch, is provided. The temperature-dependent switch switches depending on a temperature. In the present case, the temperature-dependent switch is configured such that when a temperature threshold value is exceeded, a current supply to the PTC thermistors provided for heating is interrupted. General overheating may be reliably avoided by the temperature-dependent switch.

The temperature-dependent switch may be arranged such that it can be switched by the temperature of two different PTC thermistors connected electrically in parallel, wherein the two PTC thermistors are provided for heating. It is then sufficient for one of two PTC thermistors electrically connected in parallel to become too hot for the power supply to be interrupted by the temperature-dependent switch. This increases safety, since in this configuration it is harmless if one of the two electrical PTC thermistors provided for heating a food is damaged.

In selected embodiments, a temperature sensor of the food preparation apparatus is arranged such that it may be heated by two different electrical PTC thermistors connected electrically in parallel which are provided for heating. If one of the two electrical PTC thermistors is damaged, a temperature may still be suitably measured. This measure also serves the safety and the longevity of the food preparation apparatus.

The exemplary electrical PTC thermistors provided for heating a food consist of a heating-conductor alloy having an electrical resistivity of at least 0.3 $\Omega \cdot mm^2/m$, preferably of at least 1 $\Omega \cdot mm^2/m$. Electrical current may thus be converted into heat with a high degree of efficiency.

The food preparation apparatus creates a self-regulating system that generates heat with priority at cold locations. Only two electrical contacts are required to operate the self-regulating system. The self-regulating system may be manufactured using a thick film process. The primary effect does not consist in the fact that heat must be diverted, but that the position of heat generation is adjusted. An active control is not required. No switching elements or actuators are involved in the regulation. Simple implementation is possible without the use of additional materials, such as copper. Compared to systems with high heat capacity, the dynamics are higher. Unfavorable materials such as palladium, through which a PTC effect is to be avoided, may be dispensed with, at least with respect to the PTC thermistors. In particular, these therefore preferably do not comprise palladium.

The food preparation apparatus is in one particular embodiment a food processor comprising a mixing tool. The mixing tool is driven, for example, by an electrical motor.

During operation, the shaft for the mixing tool may be surrounded by PTC thermistors which are provided for heating.

In the following, exemplary embodiments of the food preparation apparatus are explained in more detail.

BRIEF DESCRIPTIONS OF THE DRAWINGS

Figure 2:
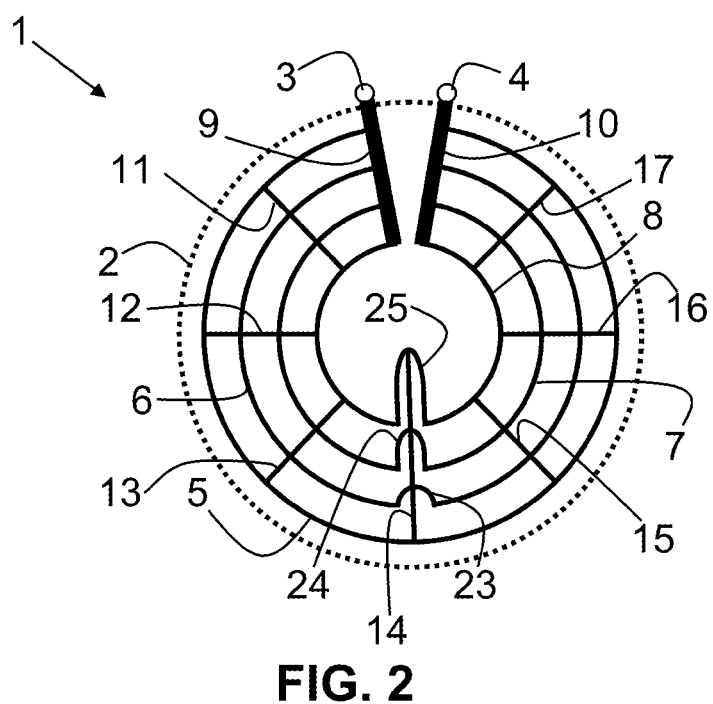
Figure 3:
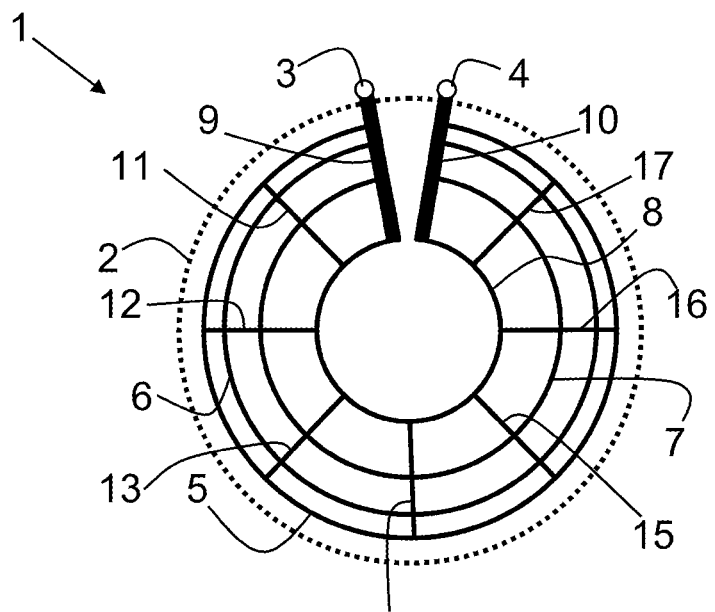
Figure 4:
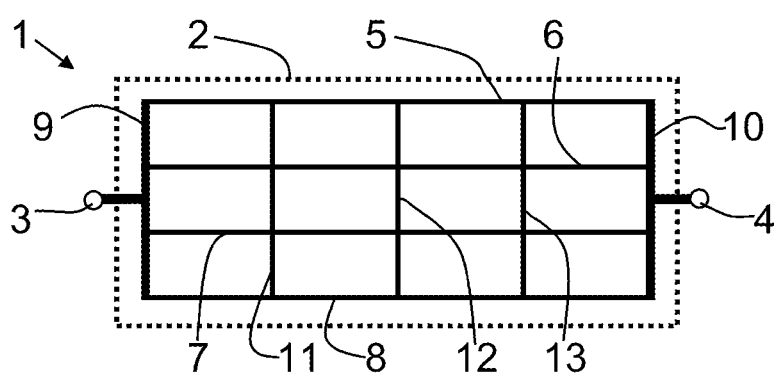
Figure 5:
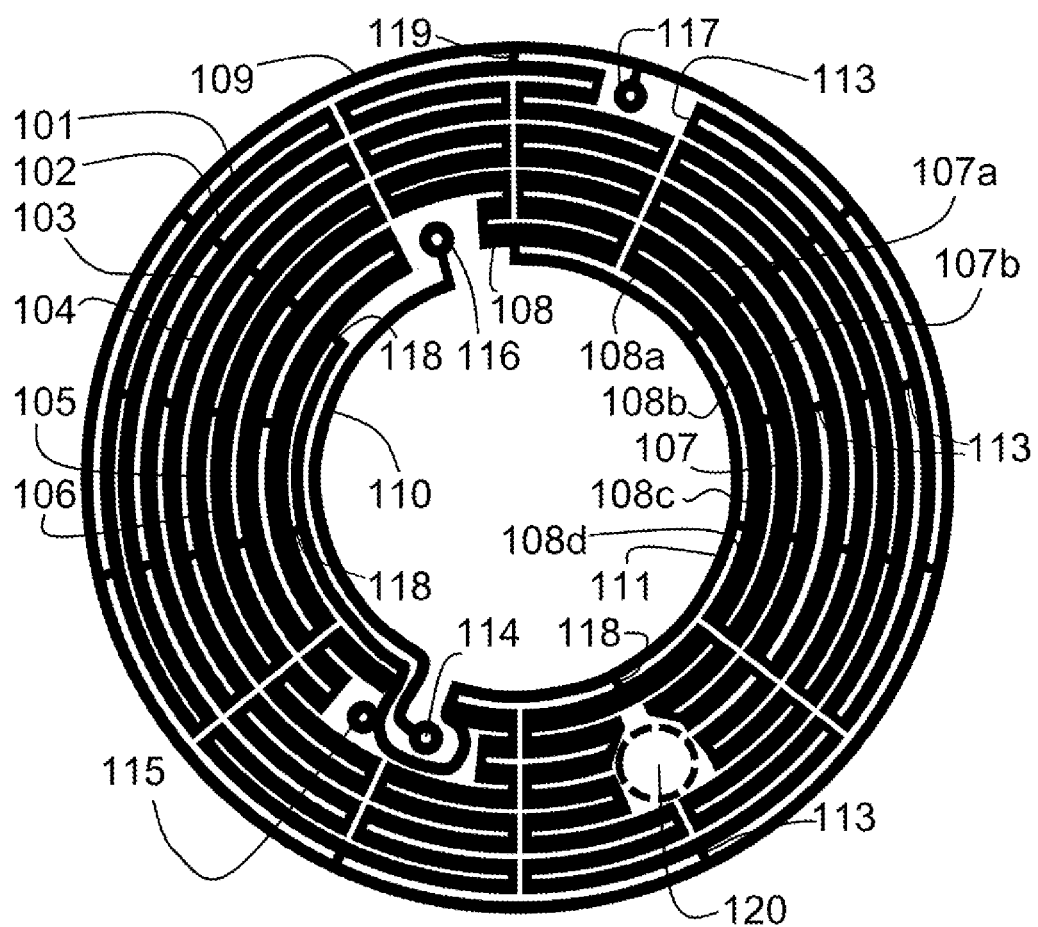
Figure 6:
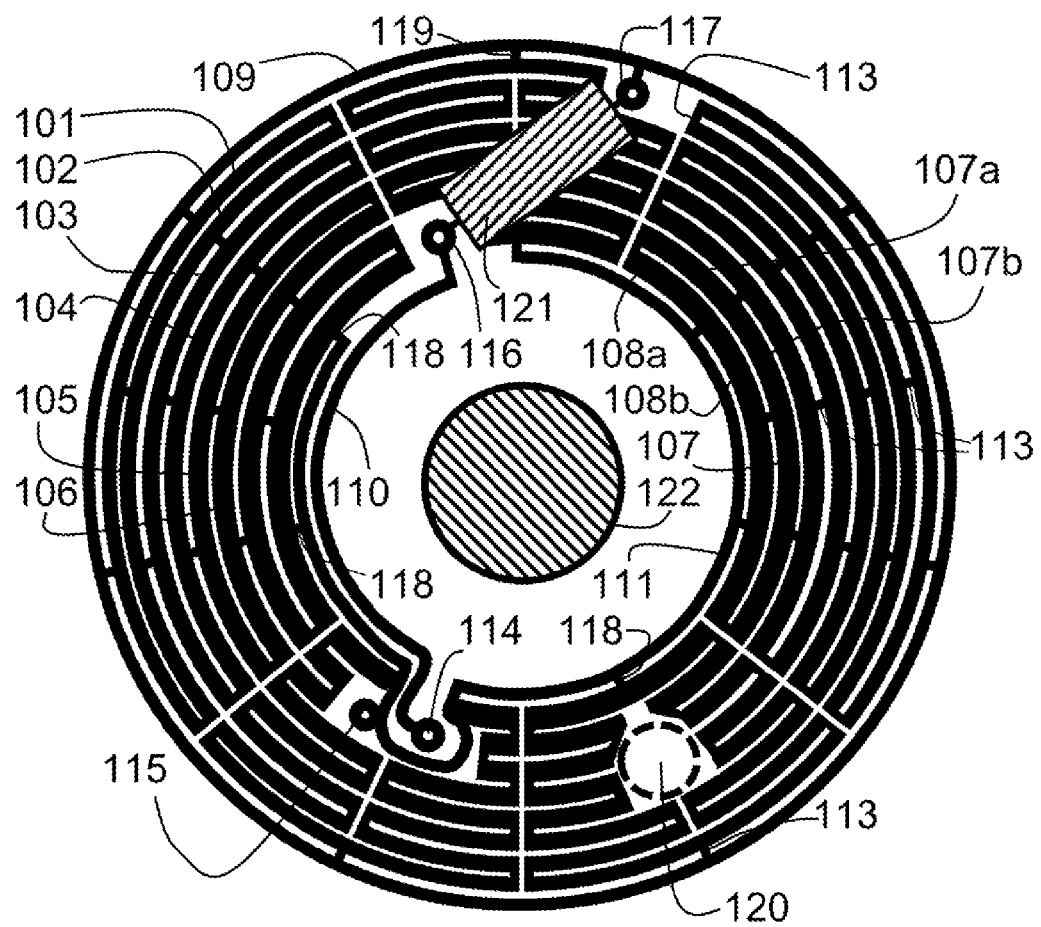
Figure 7:
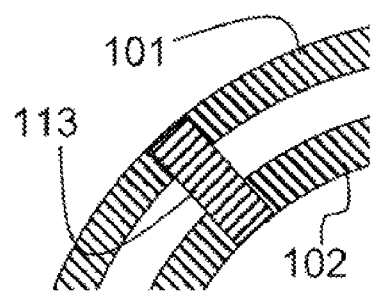
Figure 8:
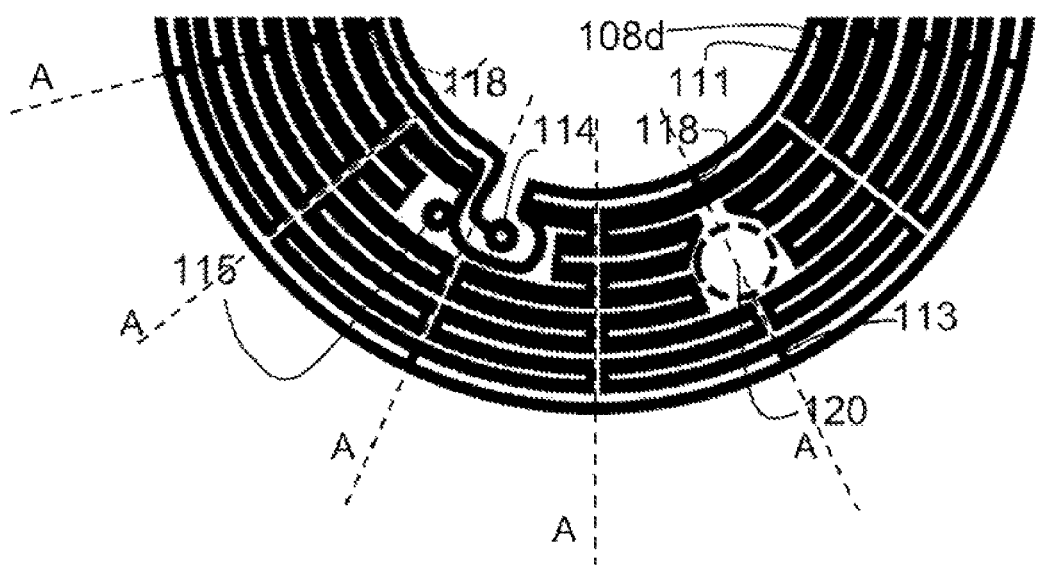

The figures show
FIG. 1: Heating plate of a first configuration;
FIG. 2: Heating plate of a second configuration;
FIG. 3: Heating plate of a third configuration;
FIG. 4: Heating plate of a fourth configuration;
FIG. 5: Heating device of a fifth configuration;
FIG. 6: Heating device of the fifth configuration with bimetal switch;
FIG. 7: Detail with two PTC thermistors and a bridge;
FIG. 8: Detail of FIG. 5.

DETAILED DESCRIPTION

FIG. 1 shows a heating plate 1 of a food preparation apparatus. The food preparation apparatus may be a stove or a food processor. The heating plate may be a hot plate or the bottom of a vessel or pot in which a food can be prepared. The hot plate 1 comprises a plate 2, which may be circular as shown in FIG. 1. However, the plate 2 may also be rectangular, for example. The plate 2 may, for example, consist entirely or predominantly of a ceramic, of glass and/or of metal. The heating plate 1 comprises an electrical heating device with two electrical terminals 3 and 4. To the one electrical terminals 3, for example, the positive pole of an electrical direct current source may be or is connected. To the other electrical terminal 4 the negative pole of the electrical direct current source may be or is connected. The electrical terminals 3, 4 generally consist of metal, for example entirely or predominantly of copper, aluminum or steel. The electrical heating device comprises a plurality of PTC thermistors 5, 6, 7 and 8, for example electrical conductors consisting of metal and having a positive temperature coefficient. For example, the PTC thermistors 5, 6, 7, 8 may consist entirely or predominantly of copper, aluminum, and/or iron. If an electrical current flows through the PTC thermistors 5 to 8, the PTC thermistors 5 to 8 are heated as a result. The heat thus generated can be supplied to a food for preparation.

In FIG. 1, four electrical PTC thermistors 5 to 8 are shown. However, more than four electrical PTC thermistors or fewer than four electrical PTC thermistors may also be provided.

The PTC thermistors 5, 6, 7, 8 are electrically connected in parallel. The first ends of the PTC thermistors 5, 6, 7, 8 are therefore electrically connected to each other by a first electrical connection conductor 9, and the second ends of the PTC thermistors 5, 6, 7, 8 are electrically connected to each other by a second electrical connection conductor 10. The first electrical connection conductor 9 is electrically connected to the one electrical terminal 3. The second electrical connection conductor 10 is electrically connected to the other electrical terminal 4.

The PTC thermistors 5 to 8 electrically connected in parallel are electrically interconnected by electrical bridges 11 to 17. The electrical bridges 11 to 17 can also consist entirely or predominantly of a metal such as copper, aluminum or iron.

If the heating plate 1 is connected to a power source and an electrical current flows through the PTC thermistors 5 to 8, this heats the heating plate 1. The electrical PTC thermistors 5 to 8 connected in parallel are thus resistance heating conductors for heating a food. The electrical resistance of the PTC thermistors 5 to 8 increases as a result of the heating. If there is now a region 18 which heats up more than heated regions adjacent to it, the sections of the PTC thermistors affected by this are heated up more. In the case of FIG. 1, these are sections 19, 20 of the two outer PTC thermistors 5 and 6, which are located between the electrical bridges 12 and 13. Therefore, due to the temperature, the electrical resistance increases more in these sections 19 and 20 compared to the electrical resistance in the adjacent sections 21 and 22. This causes electrical current coming from the electrical terminal 3 across the bridge 12 to flow, for example, to the sections 21 and 22. After passing sections 21 and 22, electrical current will flow through bridge 13 back to both PTC thermistors 5 and 6. Thus, the heating power will be lowered in the region 18 which has heated up excessively. It is true that sections 21 and 22 will then produce more heat than expected. Overall, however, there is a more favorable distribution of the heat generated by PTC thermistors 5 to 8.

A locally more heated region 18 can occur, for example, because heat can be transported away locally to a reduced extent to a food and therefore a heat accumulation occurs.

The PTC thermistors 5 to 8 electrically connected in parallel can be located within the plate 2, i.e. integrated into the plate 2. The PTC thermistors 5 to 8 electrically connected in parallel may be attached to the underside of the plate 2. If a food is prepared, it is then located above the upper side of the plate 2.

The material of the bridges 11 to 17 can advantageously be selected such that the temperature coefficient of the electrical bridges 11 to 17 is smaller than the temperature coefficient of the electrical PTC thermistors 5 to 8 connected in parallel. However, the temperature coefficient of the electrical bridges 11 to 17 can also be zero or smaller than zero.

The electrical resistance of each electrical bridge 11 to 17 can advantageously be smaller than the electrical resistance of a section 19, 20, 21, 22 of an electrical PTC thermistor 5, 6, 7, 8 located between two adjacent electrical bridges 12, 13.

In the case of FIG. 1, the electrical PTC thermistors 5 to 8 connected in parallel run circularly as well as parallel to each other in order to be able to heat the upper side of plate 2 provided for this purpose as uniformly as possible. The electrical PTC thermistors 5 to 7 connected in parallel thus run along a circular path. The distances between the electrical PTC thermistors 5 to 8 connected in parallel are the same in the case of FIG. 1.

The cross-section of the electrical PTC thermistors 5 to 8 can decrease from the outside to the inside, as schematically indicated in FIG. 1, in order to be able to generate heat in a favorably distributed manner. The cross-section of the outer PTC thermistor 5 is thus larger than the cross-section of the adjacent PTC thermistor 6. The cross-section of the PTC thermistor 6 is larger than the cross-section of the other adjacent PTC thermistor 7. The cross-section of the PTC thermistor 7 is larger than the cross-section of the other adjacent PTC thermistor 8.

In the case of FIG. 1, the electrical bridges 11 to 17 have equal distances between them. The distances between electrical connection conductors 9, 10 on the one hand and the adjacent bridges 11, 17 on the other hand are the same as any distance between two adjacent bridges 11 to 17.

FIG. 2 shows a second configuration of the present disclosure. This differs from the configuration of FIG. 1 in that the PTC thermistors 5 to 8 are of the same or at least similar length, while the cross-sections of the electrical PTC thermistors 5 to 8 are the same size. This is achieved by loops 23 to 25 of different lengths, i.e. by a deviation from the otherwise circular course of the PTC thermistors 5 to 8. The outer PTC thermistor 5 has no loop. The neighboring PTC thermistor 6 has a comparatively short loop 23. The next PTC thermistor 7 has a loop 24 of medium length. The inner PTC thermistor 8 has a loop 25 with the greatest length. Since the predominantly circular PTC thermistors 5 to 8 are of the same length or at least similar length due to the loops 23 to 25 and are also otherwise consistent, the electrical resistances of the PTC thermistors 5 to 8 are the same or at least similar. Per length unit, each PTC thermistor thus generates the same heat output or at least a similar heat output at the same temperature. This helps to be able to heat a desired area evenly in order to achieve good cooking results.

The loops 23 to 25 do not have to lie in the same plane as the other sections of the PTC thermistors 5 to 8. They can, for example, protrude from the underside of the plate 2 so as not to locally overheat a food located above them in the region of the loops 23 to 25 during preparation.

FIG. 3 shows a third configuration of the present disclosure. This differs from the configuration of FIG. 1 in that the cross-sections of the otherwise identical electrical PTC thermistors 5 to 8 are the same size. However, the distance between the PTC thermistors 5 to 8 increases from the outside to the inside. Thus, the distance between the two outer PTC thermistors 5 and 6 is small. The distance between the two inner PTC thermistors 7 and 8 is large. The distance between the two PTC thermistors 6 and 7 has a mean value compared to the other two distances. It is true that the longer the respective PTC thermistor 5 to 8 is, the lower the heating power of the PTC thermistor 5 to 8 in relation to a length unit. This is because the electrical resistance increases with increasing length of a PTC thermistor 5 to 8. However, since the distance between the PTC thermistors decreases as viewed from the inside to the outside, the desired area can still be heated evenly to achieve a good cooking result.

It is also possible to combine the different measures disclosed in FIGS. 1 to 3 in order to be able to heat an area uniformly. FIGS. 1 to 3 show the case where the PTC thermistors 5 to 8 are almost completely circular. However, they can also be only approximately semicircular and be combined with further approximately semicircular PTC thermistors together with bridges and electrical terminals, so that a circular area can be heated uniformly or at least substantially uniformly.

FIG. 4 shows the case of a rectangular plate 2 which can be heated by PTC thermistors 5 to 8. Each PTC thermistor 5 to 8 is of the same type and runs in a straight line parallel to one edge of the plate 2. The PTC thermistors 5 to 8 have equal distances from each other. There are three bridges 11, 12 and 13 which electrically connect the PTC thermistors 5 to 8 to one another. The bridges 11, 12 and 13 have equal distances between them. The distances between an electrical connection conductor 9, 10 and the respective adjacent bridge 11 or 13 are also the same, as shown in FIG. 4.

Such a plate 2 can be, for example, a side wall of an oven, via which the interior of the oven can be heated.

FIG. 5 shows an electrical heating device for a food preparation apparatus with a large plurality of electrical PTC thermistors 101 to 108 provided for heating a food. There is a very large plurality of PTC thermistors electrically connected in parallel which are configured for heating and consequently provided for heating. For example, when an electrical current flows through a bridge 118 to an electrical PTC thermistor 108, the current splits into two partial currents. One partial current flows through section 108a and one partial current flows through section 108b of the electrical PTC thermistor 108. The partial currents then flow via bridges 113 to sections 107a and 107b of an adjacent electrical PTC thermistor 107. According to the present disclosure, the four sections 107a, 107b, 108a, 108b are counted as three PTC thermistors connected in parallel and provided for heating. The two PTC thermistor sections 108a, 107a are counted as one PTC thermistor connected in parallel because the partial current flowing through the PTC thermistor section 108a is always necessarily the same as the partial current flowing through the PTC thermistor section 107a. The two PTC thermistor sections 107b and 108b, on the other hand, are counted as two PTC thermistors connected in parallel because the partial current flowing through the PTC thermistor section 107b does not necessarily correspond to the partial current flowing through the PTC thermistor section 108b. A PTC thermistor section is a section of a PTC thermistor between two bridges 113, 118, 119. A PTC thermistor 108 provided for heating may therefore comprise up to four PTC thermistor sections 108a to 108d in the configuration of FIG. 5. A different partial current can flow through each of the PTC thermistor sections 108a to 108d.

The heating device shown in FIG. 5 comprises more than fifty PTC thermistors electrically connected in parallel for heating a food. The pie-piece-like region with PTC thermistor sections 108a to 108d and sections 107a and 107b comprises 24 PTC thermistors electrically connected in parallel. Opposite this pie-piece-like region is a pie-piece-like region of the same size in the left half of the image at the same height. This also comprises 24 PTC thermistors connected electrically in parallel. There are also three smaller pie-piece-like regions, each with two electrically parallel-connected PTC thermistors, which meander together with bridges 113. There are therefore a total of 54 PTC thermistors electrically connected in parallel which are configured and provided for heating.

Two of the aforementioned three smaller pie-piece-like regions can also be seen in FIG. 8. These can thus be seen at the bottom of FIG. 5. The third smaller pie-piece-like region lies opposite and can be seen at the top of FIG. 5. A pie-piece-like subdivision shown in FIG. 8 between two dashed lines A is half the size of a "smaller pie-piece-like region" meant here.

Two electrical PTC thermistors 101 to 108 provided for heating a food are electrically connected to each other by electrical bridges 113. These electrical bridges 113 have equal distances between them. Each electrical bridge 113 connects no more than two electrical PTC thermistors 101 to 108 to one another. Each electrical bridge 113 thus connects exactly two electrical PTC thermistors 101 to 108 which are provided for heating a food.

The electrical PTC thermistors provided for heating a food consist, for example, of an alloy comprising silver to withstand the prevailing environmental conditions. The alloy may comprise silver and palladium or consist of silver and palladium. An alloy consisting of silver and ruthenium or an alloy comprising silver and ruthenium is particularly preferred.

The electrical PTC thermistors 101 to 108 provided for heating a food run along circular paths. The electrical PTC thermistors 101 provided for heating a food run along an outer circular path. The electrical PTC thermistors 108 provided for heating a food run along an inner circular path. In between, the other electrical PTC thermistors 102 to 107 provided for heating a food run along circular paths. On each circular path there may be a plurality of electrical PTC thermistors 101 to 108, which are spatially separated from each other as shown in FIG. 5.

One reason for the spatial separation may be that two PTC thermistors electrically connected in parallel, running from the inside to the outside and provided for heating, which together with bridges 113 run in a meandering manner from the inside to the outside, are advantageous in order to be able to suitably detect temperatures. Thus, there are two such PTC thermistors electrically connected in parallel running in meandering fashion from the inside to the outside in conjunction with bridges in the space between the two electrical contacts 116 and 117. The electrical contacts 116 and 117 are electrically connected to each other by a bimetal switch not shown in FIG. 5. The bimetal switch is located above the two PTC thermistors electrically connected in parallel running in meandering fashion from the inside to the outside in conjunction with bridges 113. Both PTC thermistors electrically connected in parallel running in meandering fashion from the inside to the outside in conjunction with bridges 113 can therefore heat the bimetal switch independently of one another in such a way that it interrupts a current supply when a temperature threshold value is exceeded.

As shown in FIG. 5, the width and thus the cross-section of the electrical PTC thermistors 101 to 108 provided for heating a food increases with decreasing radius of the respective circular path.

The electrical PTC thermistors 101 to 108 provided for heating are externally circulated by an electrical conductor 109. The path of the electrical conductor 109 is closed.

However, it is not necessary that the path of the electrical conductor 109 is closed. Bridges 119 connect the externally circulating electrical conductor 109 to the electrical PTC thermistors 101 provided for heating. Bridges 119 have equal distances between them. In the case of FIG. 5, all bridges 119 have equal distances between them. The electrical conductor 109 supplies current to the electrical PTC thermistors 101 to 108 provided for heating a food.

The electrical PTC thermistors 101 to 108 provided for heating are internally circulated by an electrical conductor 111. Bridges 118 electrically connect the internally circulating electrical conductor 111 to the electrical PTC thermistors 108 provided for heating.

The electrical bridges 113, 118, 119 as well as the electrical conductors 109, 110 and 111 serving the current supply consist of a very highly electrically conductive material such as silver, copper or gold. For connecting a current source, the two electrical contacts 114 and 115 are provided. The two electrical contacts 114 and 115 are arranged adjacent to each other for unproblematic connection of a current source. From the electrical contact 114, current can flow along the electrical conductor 110 to the electrical contact 116. From the electrical contact 116, the current passes through said bimetallic switch to the electrical contact 117 and from here to the externally circulating electrical conductor 109.

The electrical conductor 110 also runs along a circular path so that a circular space remains in the center which is free of electrical conductors. The free space is thus circled by the electrical conductors 110 and 111. This free space can be used, for example, to allow a shaft for a mixing tool of the food preparation apparatus to pass through.

The bridges 118 have equal distances between them at least when they connect the internally circulating electrical conductor 111 to the same electrical PTC thermistor 108. Besides, this rule can be deviated from in order to be able to take into account geometric peculiarities which can occur due to the electrical terminals 114, 115, due to the bimetal switch between the two electrical terminals 116, 117 or due to a temperature sensor 120.

The temperature sensor 120 is arranged such that it can measure the temperature of two different PTC thermistors electrically connected in parallel which are provided for heating. The two PTC thermistors electrically connected in parallel together with bridges 113 meander from the internally circulating electrical conductor 111 to the externally circulating electrical conductor 109.

FIG. 6 illustrates the arrangement of a bimetal switch 121 connecting the electrical contact 116 to the electrical contact 117. This bimetal switch 121 is located above a pie-piece-like region with two PTC thermistors electrically connected in parallel, which are provided for heating and which meander together with bridges 113.

FIG. 6 also shows a cross-section of a shaft 122 that passes through the electrical conductors for driving a mixing tool through the clearance provided.

FIG. 7 shows two PTC thermistors 101 and 102 provided for heating which correspond to the PTC thermistors 101 and 102 provided for heating of FIG. 6. The two PTC thermistors 101 and 102 provided for heating are electrically conductively connected to each other by a bridge 113. The material of which the bridge 7 consists overlaps with the material of which the two PTC thermistors 101 and 102 provided for heating consist. In the overlap region, bridge 113 is therefore located on the respective PTC thermistor 101, 102. This ensures a particularly reliable and permanent electrical contact between bridge 113 and PTC thermistor 101 and/or PTC thermistor 102.

FIG. 8 shows a section of FIG. 5 with added dashed lines A. The lines A subdivide the heating area in a pie-piece-like manner. However, this pie-piece-like subdivision is different from the subdivision into pie-piece-like regions referred to in FIG. 5. The lines A run between PTC thermistors 101 to 108 connected in parallel which are provided for heating. The total electrical resistance of the PTC thermistors 101 to 108 provided for heating between two dashed lines A is always the same or at least substantially the same. By total resistance is meant that the electrical resistances of the PTC thermistors 101 to 108 provided for heating are added up within a pie-piece-like subdivision. It is thus achieved that substantially the same heat can be generated within a pie-piece-like subdivision between two dashed lines A. Sufficiently uniform heating of the area to be heated is thus achieved. Since the electrical resistances of the bridges 113 are much smaller compared to the electrical resistances of the PTC thermistors 101 to 108 provided for heating, in the case of the bridges 113 it is not necessary to ensure that the electrical resistances are as equal as possible in order to be able to heat as uniformly as possible. However, it is advantageous to do so nevertheless.

The electrical resistances of two PTC thermistors connected in parallel to each other which are provided for heating are therefore basically the same. In the case of FIG. 5, therefore, section 108a has the same electrical resistance as section 108b. Section 107a has the same electrical resistance as section 107b. However, the electrical resistance of sections 107a and 107b is greater than the electrical resistance of sections 108a and 108b because sections 108a and 108b are intended to cover a smaller area to be heated than sections 107a and 107b.

A bridge overlaps with a PTC thermistor provided for heating so as to contact it electrically. This is shown in FIG. 7. A bridge is then not merely adjacent to the PTC thermistor laterally, but is located in the overlap area above or below the PTC thermistor. The material of which the bridge consists is principally different from the material of which the PTC thermistor consists. In the overlap area, therefore, there are two layers arranged one above the other. This contributes to the longevity.

If the area to be heated is round, the area to be heated can be subdivided in a pie-piece manner. The total electrical resistance of the electrical PTC thermistors which are provided for heating and which are located within such a pie-piece-like subdivision is preferably equal to or at least substantially equal to the total electrical resistance of the PTC thermistors which are provided for heating and which are located within an adjacent pie-piece-like subdivision, if the pie-piece-like subdivisions are equal in size. A uniform heating result can thus be achieved.

If the area to be heated is rectangular, this rectangular area can be subdivided rectangularly. The total electrical resistance of the PTC thermistors provided for heating in a first rectangular subdivision is preferably equal to or at least substantially equal to the total electrical resistance of the PTC thermistors which are provided for heating and which are located within an adjacent rectangular subdivision of equal size. A uniform heating result can thus be achieved.

In addition to the parallel connection of electrical PTC thermistors, in one embodiment of the present disclosure there are one or more electrical bridges. Each electrical bridge is an electrical conductor that electrically connects a PTC thermistor to at least one electrical PTC thermistor connected in parallel therewith. As a result, a partial current flowing through a PTC thermistor may change. Since this also occurs at least as a function of temperature, overheated local regions can be avoided without having to provide a separate control for this. Conversely, locally cool regions are inevitably heated to a greater extent. Good cooking results can therefore be achieved quickly and reliably.

In one embodiment, the PTC thermistors electrically connected in parallel are arranged in a plate. They are then integrated into the plate. The electrically parallel-connected PTC thermistors may alternatively be mounted below a plate. The plate may be a bottom or a wall of a food preparation space. Alternatively, the plate may be part of a hot plate on which a vessel for preparing a food may be placed. By this embodiment it is ensured that the PTC thermistors are adjacent to the region in which a food can be present for preparation. Cooking results can be further improved.

In one embodiment of the present disclosure, the temperature coefficient of an electrical bridge is smaller than the temperature coefficient of the electrical PTC thermistors connected in parallel. The temperature coefficient of an electrical bridge may be less than or equal to zero. If a temperature coefficient is less than zero, the electrical resistance decreases as the temperature increases. If a temperature coefficient is zero, the electrical resistance does not change as a function of temperature. It is thus achieved in a further improved manner that partial currents are favorably distributed among the electrical PTC thermistors to avoid temperature imbalances in a food during its preparation. Cooking results can be improved accordingly quickly and reliably.

The electrical resistance of an electrical bridge is advantageously smaller than the electrical resistance of a section of an electrical PTC thermistor between the electrical bridge and an adjacent electrical bridge at the same temperature. It is thus achieved in a further improved manner that partial currents are favorably distributed to the electrical PTC thermistors to obtain good cooking results quickly and reliably.

In one embodiment, the electrical heating device comprises at least three or four electrical PTC thermistors connected in parallel. However, there may also be more than four electrical PTC thermistors connected in parallel, for example at least ten or at least twenty electrical PTC thermistors connected in parallel. Each electrical PTC thermistor is then electrically connected to at least one further electrical PTC thermistor also via an electrical bridge. In some embodiments, each electrical bridge connects all electrical PTC thermistors connected in parallel.

The electrical PTC thermistors connected in parallel are illustratively resistance heating conductors for heating a food. Sufficient heat is then generated by the PTC thermistors, which can and should be used for heating a food. Sections of each electrical PTC thermistor may, however, also comprise, for example, alternatively or additionally, another electrical heating element to alternatively or additionally generate heat through the other electrical heating element. The other electrical heating element is then supplied with electrical current via the PTC thermistor. Such a section is delimited by at least one bridge connecting this electrical PTC thermistor to another electrical PTC thermistor connected in parallel thereto.

In one embodiment, the electrical PTC thermistors connected in parallel run completely or predominantly spatially parallel to each other. Thus a good cooking result may be achieved quickly and reliably in a further improved manner.

The electrical resistances of the electrical PTC thermistors connected in parallel are the same at the same temperature, for example at room temperature. This can result in each electrical PTC thermistor generating the same heat output per length unit. This is particularly true if the PTC thermistors are otherwise the same, i.e. consist of the same material and have the same cross-sections. In a further improved manner, a good cooking result can thus be achieved quickly and reliably.

The electrical PTC thermistors connected in parallel may be of equal length in order to achieve a good cooking result quickly and reliably in a further improved manner.

There may be a plurality of electrical bridges that have equal distances between them. This may further improve a cooking result.

The electrical PTC thermistors connected in parallel may run predominantly along a circular path. This embodiment may be advantageous for solving the task of the food preparation apparatus when a circular bottom of a food preparation vessel is to be heated.

Electrical PTC thermistors connected in parallel may comprise loops of different lengths and furthermore, for example, run spatially parallel to each other in a different shape. This can be done such that heat can be generated as evenly distributed as possible. This can further improve a cooking result.

Distances between adjacent electrical PTC thermistors, can be equal. In this configuration in particular, it is advantageous to achieve, for example by means of loops, that each PTC thermistor may generate the same heat per length unit in order to be able to generate heat in a suitably distributed manner. A cooking result can thus be further improved. In the region of the loops, the PTC thermistors can then have different distances from to each other.

Distances between adjacent electrical PTC thermistors connected in parallel and running at least predominantly circularly can decrease from the inside to the outside. This may be done such that heat can be generated as evenly distributed as possible. A cooking result may thus be further improved.

Cross-sections of the PTC thermistors can differ so as to control the magnitude of the partial electrical currents flowing through the PTC thermistors. This may be used to generate heat in an evenly distributed manner. For example, the cross-section of PTC thermistors may increase from the inside to the outside when PTC thermistors run along a circular path. A cooking result may thus be further improved.

The food preparation apparatus may be a food processor comprising a pot for preparing a food in the pot. The food processor may comprise a mixing tool for mixing a food and/or a scale for determining a weight of a food.

However, the food preparation apparatus may also be a stove, an oven, or a microwave oven.

The bottom of a cooking vessel may comprise the PTC thermistors electrically connected in parallel. A food processor may comprise the cooking vessel. The cooking vessel may also be the container in which ingredients for food can be mixed and/or chopped and/or weighed.

The principle of the present disclosure may also be applied to inductive heating elements or microwave generators. Thus, a plurality of coils may be provided to inductively heat a vessel or the food directly with microwaves.

Designs in accordance with this disclosure may prevent food from burning by automatically redistributing electrical current. The disclosed designs selectively generate heat at cold locations, inherently avoiding hotspots.

For example, designs incorporating teachings in this disclosure may provide for uniform temperature distribution on a hot plate. In this way, the burning of food may be avoided and the heating time can be reduced by a more uniform heat input into the product to be cooked, i.e. into the food. This is possible without additional electrical connections, control or even switches and is completely self-regulating. No additional components are required for this, which keeps the installation space as well as the manufacturing costs low.

One difference to existing systems with heat spreading layers is that, according to the present disclosure, the redistribution takes place before the conversion of electrical energy into thermal energy. This can significantly improve the dynamic response. No additional technical effort is required for materials with particularly good thermal conductivity. Compared to proven other solutions, the use of palladium may be advantageously reduced, because the reduction of the alloy component palladium in the heating conductor even favors electrical redistribution for the proposed system. If the electrical PTC thermistors connected in parallel are integrated in a pot of a food processor, the ergonomics of the pot are not negatively influenced by excessive weight.

Designs in accordance with this disclosure may use the PTC effect of a current-carrying heating conductor, i.e. the increasing electrical resistance with increasing temperature, to suitably redistribute electrical current in a targeted manner. The electrical PTC thermistors connected in parallel can be divided into concentric rings in the form of conductive tracks and can then be used to uniformly heat a heating plate.

When there are no heat blockages (for example, due to burnt food) on the hot plate, the electrical current is distributed according to the resistances of the concentric conductive tracks, i.e. the electrical PTC thermistors. For this purpose, the electrical PTC thermistors can be designed geometrically (cross-section and length) such that a defined heat flux density (power per area) is set over the radius of the heating plate (e.g. constant heat flux density). Heat may be generated in the current-carrying electrical PTC thermistors, which may lead to an increase in the temperature of a hotplate.

If there are now one or more heat blockages on the hotplate resulting in local temperature peaks, the resistance in the corresponding section of an electrical PTC thermistor in the corresponding region of the hotplate rises. This leads to an increase in electrical resistance due to the PTC effect, resulting in an automatic redirection of the current to colder locations. For this purpose, the concentric conductive tracks, i.e. the electrical PTC thermistors, are connected to each other at several locations around the circumference by electrically well-conducting bridges. The current, which takes the path of least resistance, is diverted via these bridges and distributed to other, non-blocked conductive tracks, i.e. electrical PTC thermistors. There, the electrical resistance is lower due to the lower temperature. The redistributed current generates heating at the colder regions next to the heat blockage. The hotter locations, on the other hand, can cool down. Thus, a temperature equalization is achieved.

In addition to the number, arrangement, geometry and material of the conductive tracks, i.e. the electrical PTC thermistors, and their distance from one another, the same parameters of the bridges can be varied with the aim of achieving a uniform temperature distribution at all operating points in order to achieve good cooking results quickly and reliably.

The invention claimed is:
1. A food preparation apparatus comprising
an electrical heating device comprising at least two electrical PTC thermistors for heating a food in a food preparation space,
wherein the electrical PTC thermistors are always electrically connected in parallel, wherein at least two electrical PTC thermistors for heating a food are electrically connected to each other by one or more electrical bridges, and wherein the PTC thermistors extend in a circular path extending about a center point and include at least three PTC thermistors arranged in parallel to each other, wherein each PTC thermistor extends circumferentially partway about the center point, wherein each PTC thermistor is connected to an adjacent PTC thermistor by at least two electrical bridges extending therebetween, wherein a first electrical contact for connecting to a current source is connected to an innermost PTC thermistor of the PTC thermistors, and wherein a second electrical contact for further connecting to the current source is connected to an outermost PTC thermistor of the PTC thermistors.

2. The food preparation apparatus of claim 1, wherein each electrical bridge electrically connects not more than two electrical PTC thermistors to each other.

3. The food preparation apparatus of claim 1, wherein the electrical PTC thermistors provided for heating a food consist of a heating-conductor alloy having an electrical resistivity of at least 0.3 $\Omega \cdot mm^2/m$.

4. The food preparation apparatus of claim 1, wherein the electrical PTC thermistors provided for heating a food run along circular paths.

5. The food preparation apparatus of claim 4, wherein a cross-section of the electrical PTC thermistors provided for heating a food increases with decreasing radius of a circular path.

6. The food preparation apparatus of claim 1, wherein the electrical PTC thermistors provided for heating are externally circulated by an electrical conductor which consists of a material having an electrical resistivity which is at least 10 times lower than an electrical resistivity of the material of which the electrical PTC thermistors provided for heating consist, and bridges are provided which electrically connect the externally circulating electrical conductor to the electrical PTC thermistors provided for heating.

7. The food preparation apparatus of claim 1, wherein the electrical bridges consist of a material having an electrical resistivity which is at least 10 times lower than the electrical resistivity of which the PTC thermistors provided for heating a food consist.

8. The food preparation apparatus of claim 1, wherein at least one of the bridges and the electrical conductors not intended for heating consist of silver.

9. The food preparation apparatus of claim 1, wherein bridges connected to an electrical PTC thermistor have equal distances between them.

10. The food preparation apparatus of claim 1, wherein the food preparation vessel comprises at least forty, PTC thermistors electrically connected in parallel for heating a food.

11. The food preparation apparatus of claim 1, wherein a temperature-dependent switch, is provided which interrupts a current supply to the PTC thermistors provided for heating when a temperature threshold value is exceeded.

12. The food preparation apparatus of claim 1, wherein a temperature sensor of the food preparation apparatus is arranged such that the temperature sensor may be heated by two different PTC thermistors connected electrically in parallel which are provided for heating.

13. The food preparation apparatus of claim 1, wherein PTC thermistors provided for heating together with bridges run in a meandering manner in which the PTC thermistors run alternatingly in opposing circumferential directions so as to form a serpentine shape.

14. The food preparation apparatus of claim 13, wherein two PTC thermistors provided for heating run in a meandering manner together with bridges which are electrically connected in parallel, wherein, in the meandering manner, the PTC thermistors run alternatingly in opposing circumferential directions so as to form a serpentine shape.

15. The food preparation apparatus of claim 1, wherein the electrical PTC thermistors provided for heating are internally circulated by an electrical conductor which consists of a material having an electrical resistivity which is at least 10 times lower than an electrical resistivity of the material of which the electrical PTC thermistors provided for heating consist, and bridges are provided which electrically connect the internally circulating electrical conductor to electrical PTC thermistors provided for heating.

16. The food preparation apparatus of claim 15, wherein the electrical conductor consists of a material having an electrical resistivity which is at least 100 times lower than the electrical resistivity of the material of which the electrical PTC thermistors provided for heating consist.

17. The food preparation apparatus of claim 7, wherein the electrical bridges consist of a material having an electrical resistivity which is at least 100 times lower than the electrical resistivity of which the PTC thermistors provided for heating a food consist.

18. The food preparation apparatus of claim 11, wherein the temperature-dependent switch is arranged such that it is configured to be switched by the temperature of two different PTC thermistors connected electrically in parallel which are provided for heating.

19. The food preparation apparatus of claim 11, wherein the temperature-dependent switch is provided by a bi-metal switch.

* * * * *